United States Patent
Brück et al.

(10) Patent No.: US 7,871,576 B2
(45) Date of Patent: Jan. 18, 2011

(54) METAL FOIL HAVING DIFFERENT INDENTATIONS AND ASSEMBLY, HONEYCOMB BODY AND EXHAUST GAS TREATMENT DEVICE HAVING A METAL FOIL

(75) Inventors: Rolf Brück, Bergisch Gladbach (DE); Wolfgang Maus, Bergisch Gladbach (DE)

(73) Assignee: EMITEC Gesellschaft fuer Emissionstechnologie mbH, Lohmer (DE)

( * ) Notice: Subject to any disclaimer, the term of this patent is extended or adjusted under 35 U.S.C. 154(b) by 974 days.

(21) Appl. No.: 11/725,336

(22) Filed: Mar. 19, 2007

(65) Prior Publication Data
US 2007/0207336 A1    Sep. 6, 2007

Related U.S. Application Data

(63) Continuation of application No. PCT/EP2005/009711, filed on Sep. 9, 2005.

(30) Foreign Application Priority Data

Sep. 17, 2004   (DE) ................. 10 2004 045 106

(51) Int. Cl.
B01D 50/00 (2006.01)
(52) U.S. Cl. .................................. 422/180
(58) Field of Classification Search ............... 422/168, 422/177, 180, 211
See application file for complete search history.

(56) References Cited

U.S. PATENT DOCUMENTS

| 5,045,403 A | 9/1991 | Maus et al. |
| 5,130,208 A | 7/1992 | Maus et al. |
| 2001/0051119 A1* | 12/2001 | Overbeek et al. ........... 422/211 |
| 2005/0274012 A1 | 12/2005 | Hodgson et al. |

FOREIGN PATENT DOCUMENTS

| DE | 235 374 A3 | 5/1986 |
| EP | 1 457 275 A1 | 9/2004 |
| WO | WO 91/01807 | 2/1991 |
| WO | WO 2004/072446 A1 | 8/2004 |

OTHER PUBLICATIONS

Rolf Bruck et al., "Metal Supported Flow-Through Particulate Trap; a Non-Blocking Solution", Internantional Spring Fuels & Lubricants Meeting & Exhibition, Orlando, FL, May 7-9, 2001, SAE Technical Paper Series 2001-01-1950.*

* cited by examiner

*Primary Examiner*—Tom Duong
(74) *Attorney, Agent, or Firm*—Laurence A. Greenberg; Werner H. Stemer; Ralph E. Locher

(57) ABSTRACT

A metal foil has a material thickness in a range of from 0.15 mm to 0.02 mm and a structure with elevations and depressions which extend over a length of the metal foil and are disposed adjacent one another. At least some of the elevations or depressions have at least one first indentation and at least one second indentation adjacent the at least one first indentation. The at least one second indentation is at a different distance from the corresponding elevation or depression than the first indentation. An assembly having filter material, a honeycomb body and an exhaust gas treatment device for mobile internal combustion engines, are also provided.

15 Claims, 3 Drawing Sheets

METAL FOIL HAVING DIFFERENT INDENTATIONS AND ASSEMBLY, HONEYCOMB BODY AND EXHAUST GAS TREATMENT DEVICE HAVING A METAL FOIL

CROSS-REFERENCE TO RELATED APPLICATIONS

This is a continuation, under 35 U.S.C. §120, of copending International Patent Application No. PCT/EP2005/009711, filed Sep. 9, 2005, which designated the United States; this application also claims the priority, under 35 U.S.C. §119, of German Patent Application DE 10 2004 045 106.0, filed Sep. 17, 2004; the prior applications are herewith incorporated by reference in their entirety.

BACKGROUND OF THE INVENTION

Field of the Invention

The present invention relates to a metal foil having a material thickness in a range of from 0.15 mm to 0.02 mm and a structure with elevations and depressions which extend over a length of the metal foil and are disposed adjacent one another. At least some of the elevations or depressions have at least one first indentation. Metal foils of that type are used, for example, in exhaust gas treatment devices for mobile internal combustion engines to delimit flow paths for the exhaust gas. The invention also relates to an assembly, a honeycomb body and an exhaust gas treatment device having a metal foil.

Several structured metal foils which are already known are used, for example, as catalyst carrier bodies for exhaust gas treatment devices. The structure of the metal foil serves initially to form or delimit, etc. flow paths or channels within or through the exhaust gas treatment device. The exhaust gas treatment device is generally constructed with flat and structured metal foils. Known constructions include corrugated structures, rectangular structures, omega-shaped structures and saw-tooth structures, etc. The structure, which generally extends over the entire length of the metal foil, is usually produced through the use of stamping tools or through the use of corrugated shafts which engage into one another. That forms a conventionally uniform structure, with the maxima (or elevations) and minima (or depressions) normally extending at the same distance from one another over the entire length of the metal foil. In that case, the elevations or depressions usually run parallel to the length of the metal foil, although curved or angularly-running elevations or depressions are also known.

It is also known to provide a structured metal foil of that type with a secondary structure. The secondary structure (or first indentation) can be formed only on the elevations, only on the depressions, between the elevations and the depressions, or else continuously over the elevations and depressions. The secondary structure is generally constructed with a lower height than the primary structure. The secondary structure can, for example, serve to manipulate the flow of a gas flow guided past the metal foil, although it is also known, for example, to use such secondary structures to form defined technical joining connections. The preferred manner of producing technical joining connections is by brazing. However, a sintering process or even welding may be used as well.

It is also known that such secondary structures are conventionally stamped, with a hole preferably being punched in the direct vicinity of the secondary structure. That generates protuberances in the metal foil. The protuberances permit targeted guidance or separation of partial gas flows to adjacent channels through the metal foil.

The above-mentioned metal foils are each used for different purposes and have already led to a multiplicity of exhaust gas treatment devices which are distinguished by a low pressure loss and high effectiveness with regard to the treatment of the exhaust gas flow which is to be purified. There is nevertheless the desire to constantly develop more efficient, longer-lasting and flexibly useable exhaust gas treatment devices.

SUMMARY OF THE INVENTION

It is accordingly an object of the invention to provide a metal foil having different indentations and an assembly, a honeycomb body and an exhaust gas treatment device having a metal foil, which at least partially alleviate the hereinafore-mentioned disadvantages of the heretofore-known devices of this general type and achieve the aims stated above. It is intended, in particular, to provide a metal foil having a structure which permits flexible use in exhaust gas treatment devices, is simple to produce and durably withstands thermal and dynamic loads in exhaust systems of mobile internal combustion engines.

With the foregoing and other objects in view there is provided, in accordance with the invention, a metal foil. The metal foil has a metal foil length, a material thickness in a range of from 0.15 mm to 0.02 mm, and a structure having elevations and depressions extending over the length and disposed adjacent one another. At least some of the elevations or depressions have at least one first indentation and have at least one second indentation adjacent the at least one first indentation. The at least one first indentation and the at least one second indentation are at different distances from a corresponding one of the elevations or depressions.

The material thickness specified herein substantially reflects the range which permits expedient use of the metal foil in exhaust gas treatment devices. The metal foil is composed generally of a material which is resistant to high temperatures and to corrosion, in particular a steel including chrome and aluminum. The material thickness is preferably in a range of from 0.1 mm to 0.04 mm.

The term "structure" also encompasses all of the primary structures specified in the introduction, although the structure in particular has a corrugated or sinusoidal construction. In this case, elevations and depressions are formed which extend preferably parallel to one another over the entire length of the metal foil. The summits or crests of the elevations and/or depressions can accordingly be constructed to be round, angular or of some other shape.

The structure now has a first indentation. That indentation can be formed relative to some or all of the elevations, some or all of the depressions, or the depressions and the elevations. In this case, it is also possible for the elevations or depressions to be formed with a plurality of first indentations, preferably disposed in series in the direction of the length of the metal foil or of the elevations or depressions. The indentations can be produced through the use of pressing, rolling or in some similar way. The indentations can extend (radially) beyond the elevations or can point in the opposite direction, with the same being true for the depressions.

It is now proposed according to the invention that at least one second indentation be provided adjacent the at least one first indentation. The second indentation can differ from the first indentation in terms of shape, extent, etc., although this is not strictly necessary. The first indentation and the second indentation differ in any case with respect to their distance or spacing from the corresponding elevation or depression. That is to say, in other words that, for example, in an embodiment of a first indentation and a second indentation in one elevation, the furthest remote partial region of the first indentation from the elevation is at a different distance from the elevation than the furthest remote partial region of the second indentation, with the distance being determined at regular intervals perpendicular to the plane of extent of the metal foil. The elevation or depression is therefore now formed, for example, with a stepped construction, with the individual steps being formed by the first and second indentations. It is fundamentally also possible to provide further indentations at different distances from the corresponding elevation or depression, so as to generate a multi-stepped profile.

With such a construction of the metal foil, it is made possible to allocate different functions to the elevations and depressions and the first and second indentations, thereby permitting very flexible manipulation of the exhaust gas flow in later use or variable fixing of the metal foil to adjacent metal foils and/or to a housing of the exhaust gas treatment device. Even more details regarding this are provided in the following text.

In accordance with another feature of the invention, the indentations of the metal foil extend in one direction from the corresponding elevation or depression. In other words, this means that, in the case in which the first indentation projects for example (radially) beyond an elevation, the second indentation likewise projects beyond the elevation. It is preferable in this case for the absolute distance or spacing of the second indentation from the elevation to be greater than the absolute distance or spacing of the first indentation. It is very particularly preferable for the metal foil to be constructed in such a way that the first and second indentations do not extend beyond the elevations or depressions but are formed in the opposite direction. In other words, this means that all of the elevations or all of the depressions in each case define a type of (planar or flat) interface which is not penetrated by the indentations.

In accordance with a further feature of the invention, at least the first indentation or the second indentation is in the shape of a plateau. It is preferable for the first and the second indentation to be constructed as plateaus. The term "plateau" is intended to mean a substantially planar or flat profile of the indentation, that is to say in particular that the indentations are not likewise provided with a corrugated shape but have at least one partial region in which they run in an approximately flat or planar manner. The plateau preferably also constitutes that partial section of the indentation which is at the greatest distance from the respective elevation or depression. Such a construction of the indentation as a plateau produces defined contact faces, which is advantageous for later use, as is explained further below.

In accordance with an added feature of the invention, at least the first indentation or the second indentation is constructed to be permeable to gas. This means in particular that the metal foil can be traversed by a gas in the region of the indentation. In order to make this possible, it is, for example, possible for openings, which permit a throughflow of gases, to be formed in the metal foil. Communicating channels are, for example, thereby formed when using a metal foil of this type in an exhaust gas treatment device, with it being possible for partial gas flows from one channel to flow through the openings of the indentations into an adjacent channel. This variant is particularly suitable, for example, when the metal foil is used as a filter support material in an exhaust gas treatment device, although it is also advantageous for many other applications to construct the metal foil to be impermeable to gas.

In accordance with an additional feature of the invention, the elevations and depressions of the metal foil form a height of the metal foil, with the distance or spacing to the first indentation being in a range of from 50% to 20% of the height. This provides relatively low deformation of the elevations or depressions during production with material damage or shape defects being avoided. Such material damage or shape defects would otherwise under some circumstances lead to fractures in the metal foil under high thermal and dynamic loading, as occurs later in use in an automobile.

In accordance with yet another feature of the invention, in this context, the elevations and depressions form a height of the metal foil, with the distance or spacing to the second indentation being in a range of from 100% to 40% of the height. An embodiment is particularly preferable in which the second indentation is constructed with a distance or spacing which is approximately in a range of double the distance or spacing of the first indentation.

In accordance with yet a further feature of the invention, a first indentation of the metal foil adjoins an end side of the metal foil. In other words, this means that, at least at one end side, the elevation or depression is formed directly with a first indentation. It is thereby possible, for example, for the contact regions to adjacent metal foils or housings in later use to be precisely defined, with such contact being prevented specifically in the direct vicinity of the end side of the metal foils.

With the objects of the invention in view, there is also provided an assembly, comprising a filter material and a support structure including a metal foil according to the invention. At least the at least one first indentation or the at least one second indentation of the metal foil forms a receptacle for the filter material.

If the filter material is constructed, for example, with a constant material thickness, then in each case the first or the second indentations serve as a receptacle. In the case of filter material with a varying material thickness, all of the indentations can serve as a receptacle or contact face for the filter material. Such a construction of the assembly prevents, for example, a displacement of the filter material in the direction of the elevations and depressions. At the same time, the edges of the filter material are at least partially protected from being directly exposed to flow. It is nevertheless possible to provide additional technical joining connections which provide captive fixing of the filter material to the support structure which is constructed as a metal foil. The filter material preferably extends over the indentations of a plurality of elevations and/or depressions. The term "receptacle" is intended in particular to mean an embodiment of the indentations which is constructed so as to at least partially provide form-locking engagement between the metal foil and the filter material. A form-locking connection is one which connects two elements together due to the shape of the elements themselves, as opposed to a force-locking connection, which locks the elements together by force external to the elements.

In accordance with another feature of the invention, it is advantageous, in an assembly of this type, for the filter material to have a material thickness which at least partially corresponds to the distance of the first indentation or the second indentation. This prevents, for example in the case of a plurality of such assemblies being stacked on top of one another, contact between the adjacent support structure and the filter material, since contact takes place exclusively through the metal foils.

With the objects of the invention in view, there is additionally provided a honeycomb body, comprising at least partially structured metal foils forming a multiplicity of channels. The at least partially structured metal foils include at least one structured metal foil according to the invention.

A honeycomb body of this type is preferably constructed by using a plurality of structured metal foils and flat metal foils which are alternately stacked and subsequently connected to or wound with one another. This results in desired cross sections of the honeycomb body, for example round, oval, polygonal, etc. It is fundamentally possible in this case for the flat and/or structured metal foils to be provided with apertures, so as to produce connections to adjacently disposed channels. The number of channels per square inch is preferably in the region of 200 cpsi ("cells per square inch," in which one square inch corresponds to approximately 6.4516 square centimeters) to 1600 cpsi. In this case, the channels can be entirely traversable by flow, although it is also possible for the channels to be constructed, for example, to be closed off in an alternating fashion. The closure can be provided in this case by additional measures, although it is also possible to use one of the indentations for this purpose. Further components, for example filter material as well, can be integrated into the honeycomb body in addition to the flat and structured metal foils.

In accordance with a further feature of the invention, the honeycomb body is constructed in such a way that at least some of the channels are permeable to gas, at least relative to the first indentation or the second indentation. It is preferable for all of the channels to be constructed to be permeable to gas relative to both indentations. The permeability to gas is preferably obtained by providing a porous material which, in particular, has a filter action for particulates, soot or the like. The porosity can be matched to the desired purification action, for example by using suitable fibrous nonwoven, foam materials, ceramic materials, etc., with the materials being capable of durably withstanding the local conditions in the exhaust system of mobile internal combustion engines.

With the objects of the invention in view, there is concomitantly provided an exhaust gas treatment device for mobile internal combustion engines. The device includes at least one metal foil according to the invention, at least one assembly made from filter material and a support structure, according to the invention, or at least one honeycomb body according to the invention.

The exhaust gas treatment device can be embodied as a catalytic converter, a flow mixer, a particulate trap, a filter, an adsorber, etc. It is particularly preferable for the metal foils used in the exhaust gas treatment device to be at least partially (catalytically) coated.

Particularly preferred exemplary embodiments of the invention and the technical field are explained in more detail on the basis of the figures. It is to be noted herein that the invention is not restricted to the illustrated embodiment variants.

Other features which are considered as characteristic for the invention are set forth in the appended claims, noting that the features listed individually in the claims can be combined with one another in any desired technologically expedient way and lead to further embodiments of the invention.

Although the invention is illustrated and described herein as embodied in a metal foil having different indentations and an assembly, a honeycomb body and an exhaust gas treatment device having a metal foil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1A, 1B:
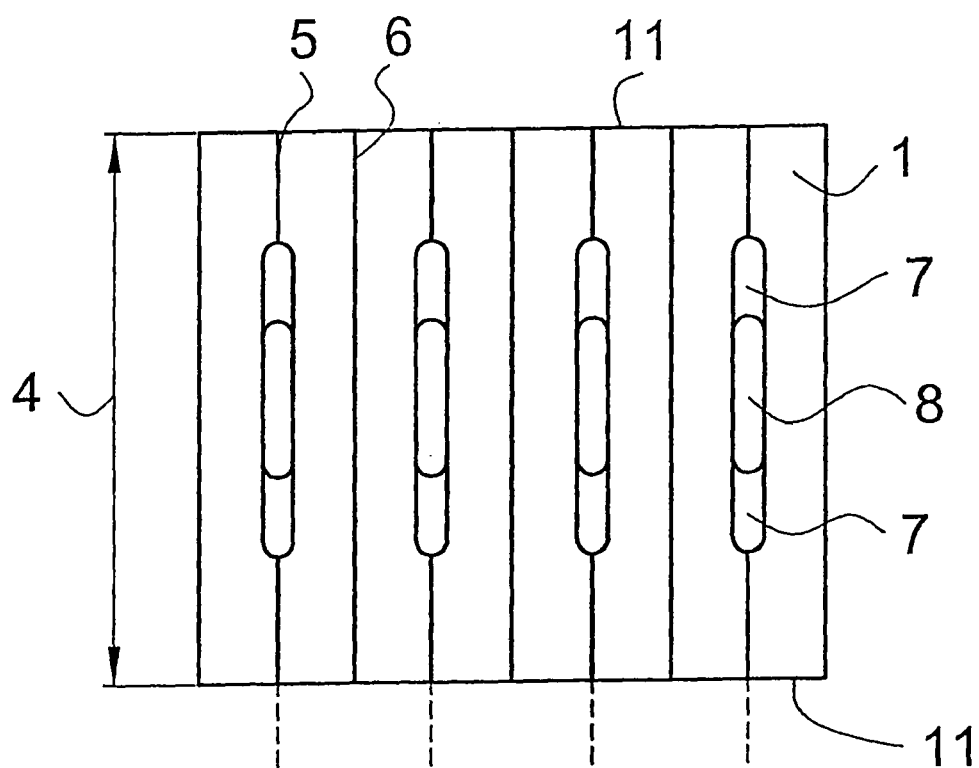
FIGS. 1A and 1B are respective plan and front-elevational views of a first embodiment of a metal foil according to the invention.

Referring now to the figures of the drawings in detail and first, particularly, to FIGS. 1A and 1B thereof, there is seen a diagrammatic illustration of a metal foil 1 having a structure 3 which is formed over a length 4 of the metal foil 1 with elevations 5 and depressions 6 disposed adjacent one another. In this case, a plan view is illustrated in FIG. 1A and a front view is illustrated in FIG. 1B.

In the embodiment illustrated herein, all of the elevations 5 which are disposed adjacent one another have two first indentations 7, between which a second indentation 8 is provided. While the elevations 5 and depressions 6 extend from one end side 11 of the metal foil 1 over the entire length 4 to the opposite end side 11, the indentations 7, 8 are formed only over part of the elevations 5.

As can be seen from the front view of FIG. 1B, the first indentations 7 and second indentations 8 extend from the elevations 5 in the direction of the depressions 6, that is to say in the opposite direction to the elevations 5. The elevations 5 and depressions 6 delimit a height 10 of the metal foil 1. Distances or spacings 9 between the indentations 7, 8 and the elevations 5 are smaller than the height 10. It can also be seen from the front view that a first distance 9 of the first indentation 7 is constructed to be smaller than a second distance 9 of the second indentation 8.

Figure 2:
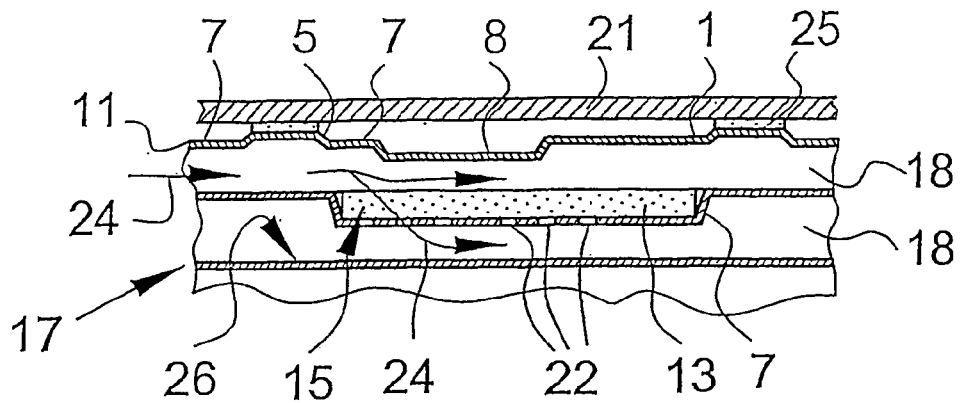
FIG. 2 is an enlarged, fragmentary, cross-sectional view of a honeycomb body.

FIG. 2 shows a portion of a honeycomb body 17 in order to illustrate an advantageous field of use of a metal foil 1 of this type. In this embodiment, the metal foil 1 is formed as a type of sleeve as an outer delimitation of the honeycomb body 17 in the direction of a housing 21. In this case, the elevations 5 are constructed so as to be in contact with the housing 21, in such a way that a connecting section 25 is formed between the elevations 5 and the housing 21. The connecting section 25 preferably includes a technical joining connection, for example through the use of a brazing material. In order to permit as unhindered an expansion or contraction of the honeycomb body 17 as possible as a result of alternating thermal loadings, no further contact points are provided between the connecting sections 25. This is provided for in such a way that the metal foil 1 has the first indentations 7 partially extending up to the end side 11 of the metal foil 1. This simultaneously ensures, for example, that additional connecting points are not generated by brazing material escaping from the connecting section 25 during production.

The metal foil 1 additionally forms a delimitation for a channel 18 which can be at least partially traversed by exhaust gas in a flow direction 24. The structure of the metal foil 1 with the second indentation 8 causes the flow behavior of the exhaust gas to be manipulated as illustrated by arrows. Some of the exhaust gas flow is, for example, forced to flow through an adjacent metal foil, with the exhaust gas simultaneously passing through a filter material 13.

The filter material 13 is fixed through the use of a metal foil 1 which has only a first indentation 7. The first indentation 7 is now at a distance 9 from the elevation 5, or from the surface if flat metal foils are used in this case, which corresponds substantially to a material thickness 16 (see FIG. 3) of the filter material 13. The metal foil is additionally provided in a region of the first indentation 7, which is formed as a receptacle 15, with a plurality of openings 22 which permit a flow through the filter material 13 and the metal foil 1 to adjacent channels 18. The filter material 13 therefore serves, for example, to separate out solid particulates which are contained in the exhaust gas flow. The metal foils 1 are provided with a coating 26 which, in particular, converts gaseous pollutants that are contained in the exhaust gas.

Figure 3:
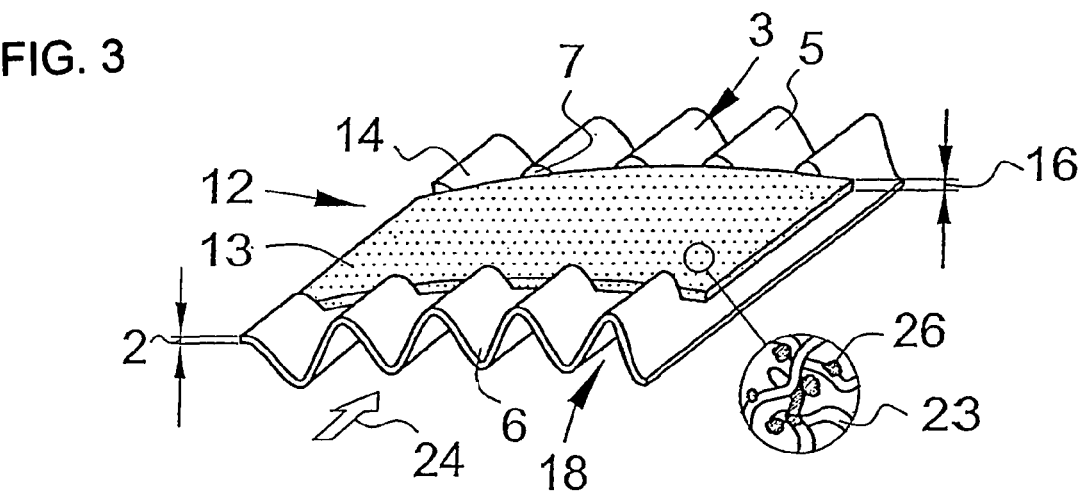
FIG. 3 is a perspective view of an embodiment of an assembly.

FIG. 3 is a diagrammatic and perspective view which shows an assembly 12 including a support structure 14 that is embodied as a metal foil 1, and a filter material 13. The support structure 14 is provided in this case with a first indentation 7 and a second non-illustrated indentation 8. It is fundamentally also possible, independently of the metal foil 1 according to the invention as described herein, to produce such support structures 14 from a metal foil 1 which has only a first indentation 7. The structure 3 of the metal foil 1 or the support structure 14 has, in turn, a uniform construction with elevations 5 and depressions 6. The structure 3 at least partially delimits channels 18 which can be traversed by an exhaust gas in a flow direction 24. The support structure 14 or the metal foil 1 has a material thickness 2 in a range of from 0.15 mm to 0.02 mm. The material thickness 16 of the filter material 13 lies approximately in the range of the first distance 9 of the first indentation 7 from the elevations 5. The filter material 13 is constructed in this case as a nonwoven of a material including fibers 23, with the fibers 23 likewise being coated with a coating 26. Metallic fibers are preferably used as the fibers 23. The metallic fibers 23 are nevertheless resistant to high temperatures and to corrosion.

Figure 4:
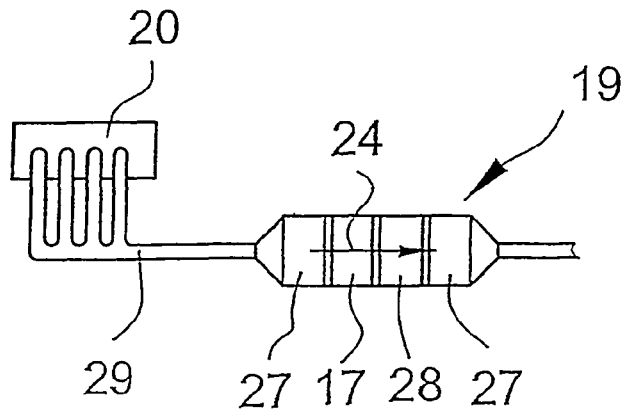
FIG. 4 is a schematic diagram showing a structure of an exhaust system of a mobile internal combustion engine with an exhaust gas treatment device.

FIG. 4 schematically shows a structure of an exhaust gas treatment device 19 of a mobile internal combustion engine 20. Exhaust gas generated in the internal combustion engine 20 flows through an exhaust line 29 to a plurality of components for exhaust gas treatment. A catalytic converter 27, a honeycomb body 17, an adsorber 28 and another catalytic converter 27 are provided, for example, in this case in the flow direction 24. The pollutants initially contained in the exhaust gas are largely depleted after the exhaust gas has flowed through these components.

Figure 5:
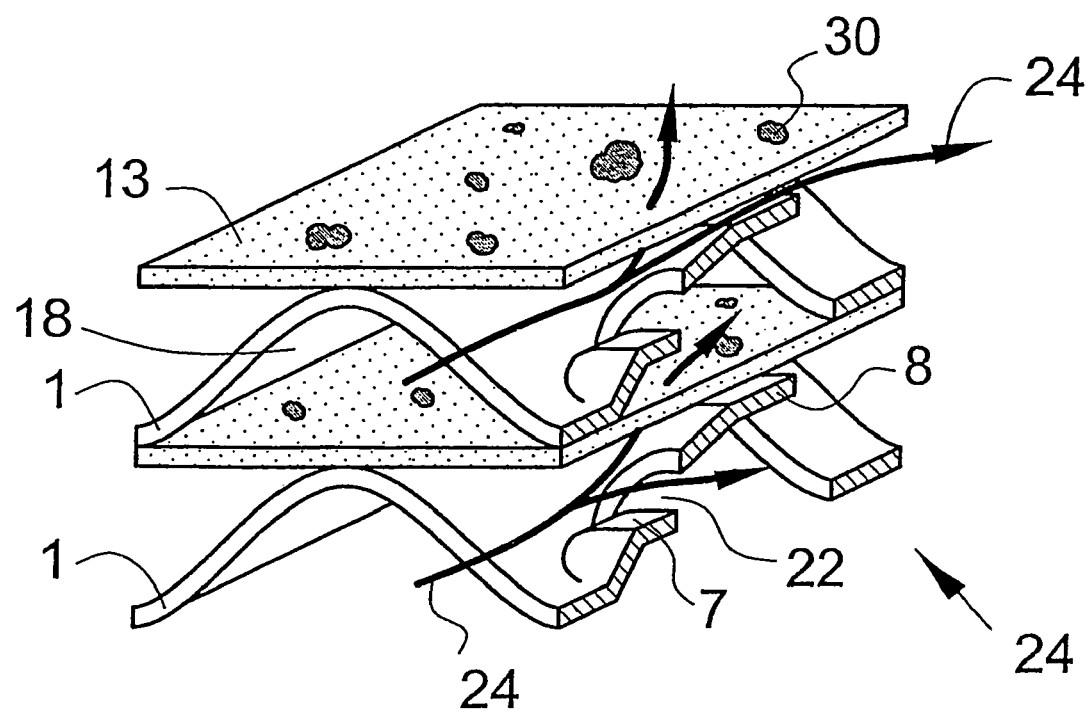
FIG. 5 is a further enlarged, fragmentary, perspective view showing part of an embodiment of the honeycomb body.

FIG. 5 is a diagrammatic and perspective view showing a part of an embodiment of the honeycomb body 17. The honeycomb body 17 is constructed with alternately disposed layers of metal foil 1 and filter material 13. While the metal foils 1 are formed with a structure 3, the filter material 13 is formed as substantially flat layers. As can be seen in the sectioned illustration, the first indentations 7 and the second indentations 8 are formed in series in the manner of guide blades, with an opening 22 being disposed in between in this case. In the illustration shown, all of the indentations 7, 8 have such an opening 22 disposed in between, although this is not strictly necessary.

The channel 18 is constructed to be permeable to gas opposite the first indentation 7 and the second indentation 8, with the wall of the channel 18 being formed there by the filter material 13. This combination leads to particularly effective cleaning of the exhaust gas flow, since the flow direction 24 is manipulated in a variety of ways, so that new partial gas flows are constantly being formed. The partial gas flows pass through the filter material 13 into adjacent channels 18, flow parallel to the filter material 13, penetrating into the latter at times, and/or merely flow past the indentations 7, 8 in the channel 18. In this case, flow vortices are repeatedly generated. The flow vortices lead to intensive contact of particulates 30 contained in the exhaust gas with the filter material, ultimately resulting in the particulates 30 being accumulated therein. The accumulated particulates 30 can then be chemically converted into gaseous constituents.

We claim:

1. A metal foil, comprising:
   a metal foil length;
   a material thickness in a range of from 0.15 mm to 0.02 mm;
   a structure having elevations and depressions extending over said length and disposed adjacent one another;
   at least some of said elevations or depressions having at least one first indentation and having at least one second indentation adjacent said at least one first indentation;
   said elevations or depressions having a stepped construction with individual steps formed by said at least one first and at least one second indentations; and
   said at least one first indentation and said at least one second indentation being at different distances from a corresponding one of said elevations or depressions.

2. The metal foil according to claim 1, wherein said at least one first and said at least one second indentations extend in one direction from said corresponding one of said elevations or depressions.

3. The metal foil according to claim 1, wherein at least said at least one first indentations or said at least one second indentations are in the shape of a plateau.

4. The metal foil according to claim 1, wherein said at least one first indentations or said at least one second indentations are permeable to gas.

5. The metal foil according to claim 1, wherein said elevations and depressions define a metal foil height, and said at least one first indentation is disposed at a distance from said elevations or depressions, said distance being in a range of from 50% to 20% of said metal foil height.

6. The metal foil according to claim 1, wherein said elevations and depressions define a metal foil height, and said at least one second indentation is disposed at a distance from said elevations or depressions, said distance being in a range of from 100% to 40% of said metal foil height.

7. The metal foil according to claim 1, wherein:
   said elevations and depressions define a metal foil height;
   said at least one first indentation is disposed at a first distance from said elevations or depressions, said first distance being in a range of from 50% to 20% of said metal foil height; and
   said at least one second indentation is disposed at a second distance from said elevations or depressions, said second distance being in a range of from 100% to 40% of said metal foil height.

8. The metal foil according to claim 1, wherein said at least one first indentation adjoins a metal foil end side.

9. An assembly, comprising:
a filter material; and
a support structure including a metal foil according to claim 1;
at least said at least one first indentation or said at least one second indentation of said metal foil forming a receptacle for said filter material.

10. The assembly according to claim 9, wherein:
said at least one first indentation is disposed at a first distance from said elevations or depressions;
said at least one second indentation is disposed at a second distance from said elevations or depressions; and
said filter material has a material thickness at least partially corresponding to said first or second distance.

11. An exhaust gas treatment device for mobile internal combustion engines, the exhaust gas treatment device comprising:
at least one assembly according to claim 9.

12. A honeycomb body, comprising:
at least partially structured metal foils forming a multiplicity of channels, said at least partially structured metal foils including at least one structured metal foil according to claim 1.

13. The honeycomb body according to claim 12, wherein at least some of said channels are permeable to gas, at least relative to said at least one first indentation or said at least one second indentation.

14. An exhaust gas treatment device for mobile internal combustion engines, the exhaust gas treatment device comprising:
at least one honeycomb body according to claim 12.

15. An exhaust gas treatment device for mobile internal combustion engines, the exhaust gas treatment device comprising:
at least one metal foil according to claim 1.

* * * * *